(12) United States Patent
Mueller et al.

(10) Patent No.: US 10,364,848 B2
(45) Date of Patent: Jul. 30, 2019

(54) HELICAL DRIVE COUPLING

(71) Applicant: Bell Helicopter Textron, Inc., Fort Worth, TX (US)

(72) Inventors: Russell L. Mueller, Dallas, TX (US); Michael S. Seifert, Southlake, TX (US); Steven K. Spears, Hurst, TX (US); Frank B. Stamps, Colleyville, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 252 days.

(21) Appl. No.: 15/190,790

(22) Filed: Jun. 23, 2016

(65) Prior Publication Data

US 2017/0370419 A1 Dec. 28, 2017

(51) Int. Cl.
| | | |
|---|---|---|
| *F16D 3/74* | (2006.01) | |
| *F16D 3/04* | (2006.01) | |
| *F16D 3/00* | (2006.01) | |
| *F16D 3/06* | (2006.01) | |
| *F16D 3/12* | (2006.01) | |
| *F16D 3/72* | (2006.01) | |

(52) U.S. Cl.
CPC ............... *F16D 3/04* (2013.01); *F16D 3/005* (2013.01); *F16D 3/06* (2013.01); *F16D 3/12* (2013.01); *F16D 3/72* (2013.01); *Y10T 464/20* (2015.01)

(58) Field of Classification Search
CPC .......... F16D 3/04; F16D 3/005; Y10T 464/20
USPC ... 464/23, 57, 58, 60, 61.1, 32.1, 34.1, 65.1, 464/77
See application file for complete search history.

(56) References Cited

U.S. PATENT DOCUMENTS

| | | | | |
|---|---|---|---|---|
| 350,631 | A * | 10/1886 | Learman | 464/58 |
| 1,157,553 | A * | 10/1915 | Kleinow | F16D 3/56 |
| | | | | 446/65.1 |
| 1,999,051 | A * | 4/1935 | Kennedy | F16C 1/06 |
| | | | | 464/58 |
| 2,514,394 | A * | 7/1950 | Irving | F16D 3/72 |
| | | | | 464/57 |
| 3,177,684 | A | 4/1965 | Bossler, Jr. | |
| 3,347,061 | A * | 10/1967 | Stuemky | F16D 3/72 |
| | | | | 464/58 |
| 3,521,465 | A | 7/1970 | Bossler, Jr. | |

(Continued)

FOREIGN PATENT DOCUMENTS

| | | | | |
|---|---|---|---|---|
| GB | 8595 | * | 5/1904 | 464/57 |
| SU | 1028912 A | * | 7/1983 | 464/57 |

OTHER PUBLICATIONS

Bellows Couplings: Flexible Shaft Couplings; http://www.servometer.com/products/couplings/.

(Continued)

*Primary Examiner* — Greg Binda
(74) *Attorney, Agent, or Firm* — Lightfoot & Alford PLLC (57) ABSTRACT

A drive coupling has first and second coaxial end adapters. A first set of at least two coaxial helical elements has a first end of each element attached to the first end adapter, and a second end of each element is coupled to the second end adapter. At least one biasing device biases the end adapters relative to each other. Torque applied to one of the end adapters is transferred through the first set of helical elements to the other end adapter, the helical elements allowing for misalignment of the end adapters during operation.

17 Claims, 9 Drawing Sheets

(56) References Cited

U.S. PATENT DOCUMENTS

| | | | |
|---|---|---|---|
| 3,685,314 A | | 8/1972 | Flannelly |
| 3,726,133 A | * | 4/1973 | Morgan ................ F16D 3/72 464/58 |
| 4,207,758 A | | 6/1980 | Stone |
| 4,385,895 A | | 5/1983 | Wirth |
| 4,548,311 A | * | 10/1985 | Lech, Jr. ............ F16F 15/1202 464/64.1 |
| 4,690,660 A | * | 9/1987 | Hashimoto ....... F16F 15/12373 |
| 5,851,150 A | | 12/1998 | Mayerjak |
| 8,231,346 B2 | * | 7/2012 | Stamps ................ F16F 1/40 |

OTHER PUBLICATIONS

Helical Shaft Couplings; http://www.abssac.co.uk/p/Helical+Shaft+Couplings/26/.

* cited by examiner

HELICAL DRIVE COUPLING

BACKGROUND

Mechanical systems often require drive shafts to transfer rotational motion and torque from one component to another. To allow for misalignment or relative motion of the components, solid drive shafts may utilize pivot couplings, such as universal joints or constant-velocity joints or deformable couplings, such as elastomeric couplings, at input and output connections and at intermediate positions for multi-section drive shafts. A flexible drive shaft can allow for misalignment or relative movement through elastic deformation of the shaft itself, allowing for use of other types of couplings, such as solid couplings.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Mechanical components used in aircraft, road vehicles, and other applications may require transfer of rotational motion and torque from one component to another. For example, a drive shaft is commonly used to transfer torque from the rotating output portion of a power source, such as an engine or motor, to the rotatable input portion of a component to be driven by the power source. In applications where the input and output are coaxially aligned and in a fixed position relative to each other, a solid drive shaft can be used to connect the output and input. However, misalignment (as designed or as installed) of the power source and driven component can cause the input and output axes to intersect at an angle or to be offset from each other, and relative motion, such as rotation and/or translation, between the power source and driven component can cause random or cyclical misalignment and changes in distance between the power source and driven component.

This disclosure divulges a drive coupling having at least two helical elements connecting opposing end adapters, which are configured to couple to an output of a power component or the input of a driven component. The helical elements allow for high-speed, constant-velocity transfer of high torque between the end adapters while also allowing for limited misalignment ("cocking") of the axes and for limited axial translation ("chucking") of the power component and driven component relative to each other. Unlike couplings with universal joints, which exhibit oscillatory frequencies of 2/rev, these helical drive couplings have no oscillatory frequencies. The disclosed couplings may be used to directly couple the components, be installed on both ends of a drive shaft connecting the components, or used to couple sections of a multi-section drive shaft connecting the components.

Figure 1:
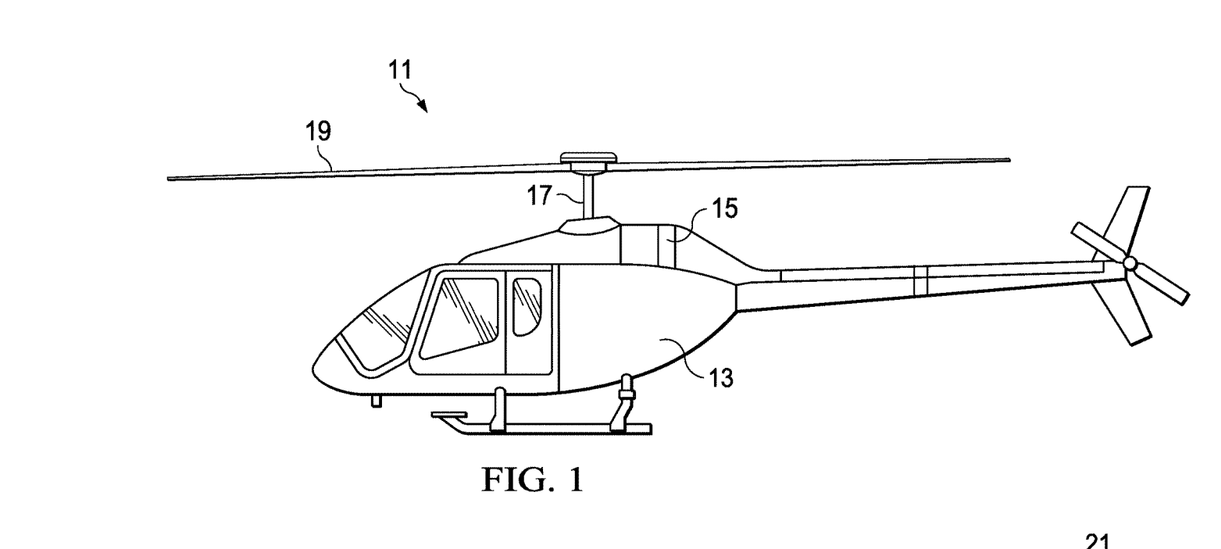
FIG. 1 is a side view of an aircraft utilizing a helical drive coupling according to this disclosure.

FIG. 1 illustrates an aircraft 11 that utilizes at least one helical drive coupling according to this disclosure. Aircraft 11 is a helicopter, though the couplings may be used in other types of aircraft or in any other appropriate application for transferring torque from an output of one component to an input of another component. Aircraft 11 has a fuselage 13 with a powertrain section 15 located at the top of fuselage 13. Powertrain section 15 houses a powertrain (see FIG. 2) that drives mast 17 and the attached rotor 19 in rotation relative to fuselage 13.

Figure 2:
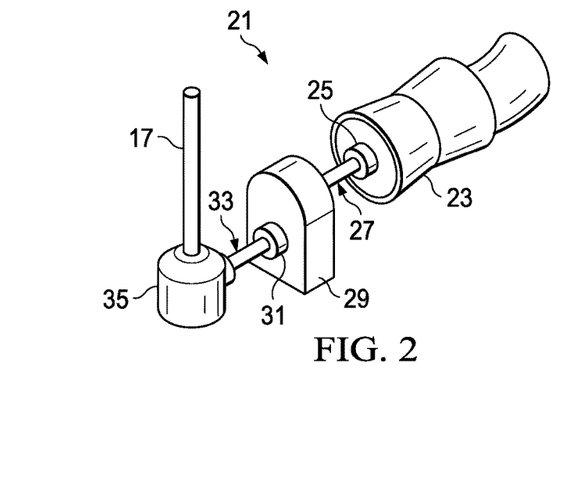
FIG. 2 is a schematic oblique view of a powertrain assembly utilizing a helical drive coupling according to this disclosure.
Figure 3:
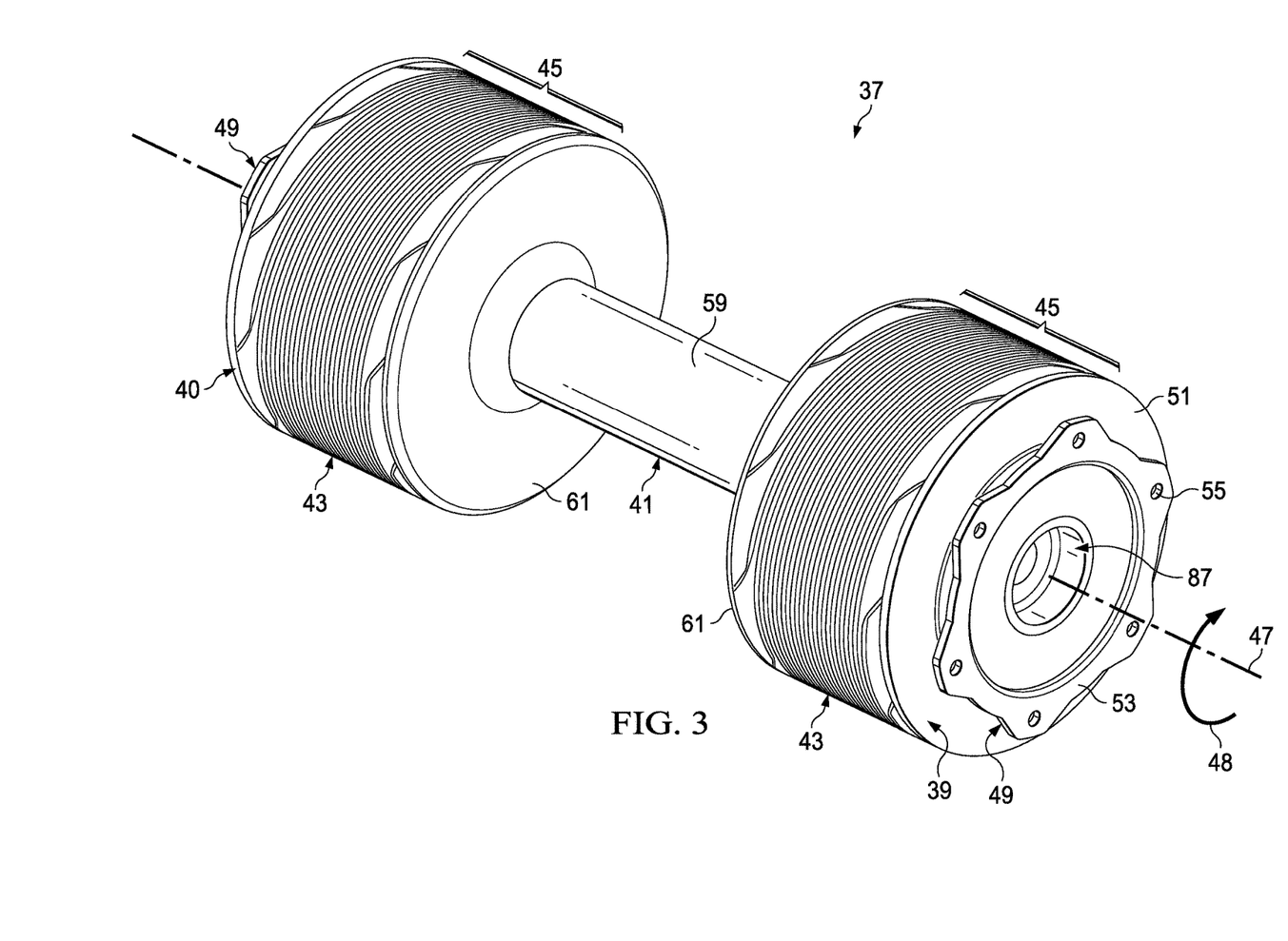
FIG. 3 is an oblique view of a helical drive coupling according to this disclosure.

FIG. 2 is a schematic view of a powertrain 21 for aircraft 11. Engine 23 has a forward output 25 that rotates a first helical drive coupling 27 for transferring torque to the rear input (not visible) of a gearbox 29. Gearbox 29 has a forward output 31 that rotates a second helical drive coupling 33 for transferring torque to the rear input (not visible) of a transmission 35, which transfers the torque to mast 17. Use of drive couplings 27, 33, which are constructed similarly and may be identical, allows for misalignment and/or relative movement between engine 23 and gearbox 29 and also between gearbox 29 and transmission 35.

FIGS. 3 through 7 illustrate a first embodiment of a helical drive coupling 37 according to this disclosure. Coupling 37 is of similar construction as couplings 27, 33 of FIG. 2, though the specific application will require specific characteristics of a particular coupling 37. As shown, coupling 37 is configured for use in a helicopter drivetrain, which requires high-speed transfer of high torque and requires accommodating only a limited amount of misalignment. In the embodiment shown, coupling 37 is designed to operate at 6000 rpm and can handle approximately 7 degrees of cocking and 0.25 in of chucking, though coupling 37 can be reconfigured to provide for higher or lower speeds and for more or less cocking and chucking.

Coupling 37 comprises three main types of components. At one end of coupling 37 is an end adapter 39, and an identical end adapter 40 is located at the opposite end of coupling 37. Each adapter 39, 40 is connected to a central drive shaft 41 by at least two coaxial, intermeshed helical elements 43 that together comprise a stack 45. Coupling 37 is configured to be rotated generally about nominal axis of rotation 47 and is elongated along axis 47. In the embodiment shown, coupling 37 is configured for use as a drive shaft on a helicopter connecting an engine/gearbox assembly to a transmission. Coupling 37 is configured for use in the rotation direction shown by arrow 48 when torque is input to end adapter 39, whereas coupling 37 can be used in the opposite rotation direction if torque is input to end adapter 40. The components of coupling 37 are preferably formed from materials, such as metals, composites, or polymers, that have sufficient stiffness to allow for transfer of torque between one another, though the particular materials, composition, characteristics, or dimensions used will vary based on the application. The following description may describe a component on one end of coupling 37, but the same description equally applies to the corresponding component on the other end of coupling 37 unless otherwise noted.

End adapters 39, 40 are generally disk shaped, and each comprises adapter flange 49 and outer stack flange 51. in the preferred embodiment, adapters 39, 40 are each formed as a unitary component, though flanges 49 51 can alternatively be formed as separate components and joined together. Adapter flange 49, as shown, is specifically configured for attachment to a corresponding output coupler of a helicopter gearbox or the input coupler of a transmission, though adapter flange 49 may be configured for use with alternative types of flanges or couplers. Flange 49 is generally disk shaped and has an outward-facing, ring-shaped mating surface 53 and multiple fastener holes 55 for fastening flange 49 to a corresponding coupler. Stack flange 51 is also generally disk shaped and has an inward-facing, planar outer stack-attachment surface 57 for attachment of the outer end of each helical element 43.

Central drive shaft 41 comprises a tube 59 elongated along axis 47 and terminating at each end in a disk-shaped inner stack flange 61. Flange 61 has an outward-facing, planar inner stack-attachment surface 63 for attachment of the inner end of each helical element 43. Drive shaft 41 is configured to transfer rotational motion and torque from one stack 45 of elements 43 to the other stack 45 of elements 43.

Figure 4:
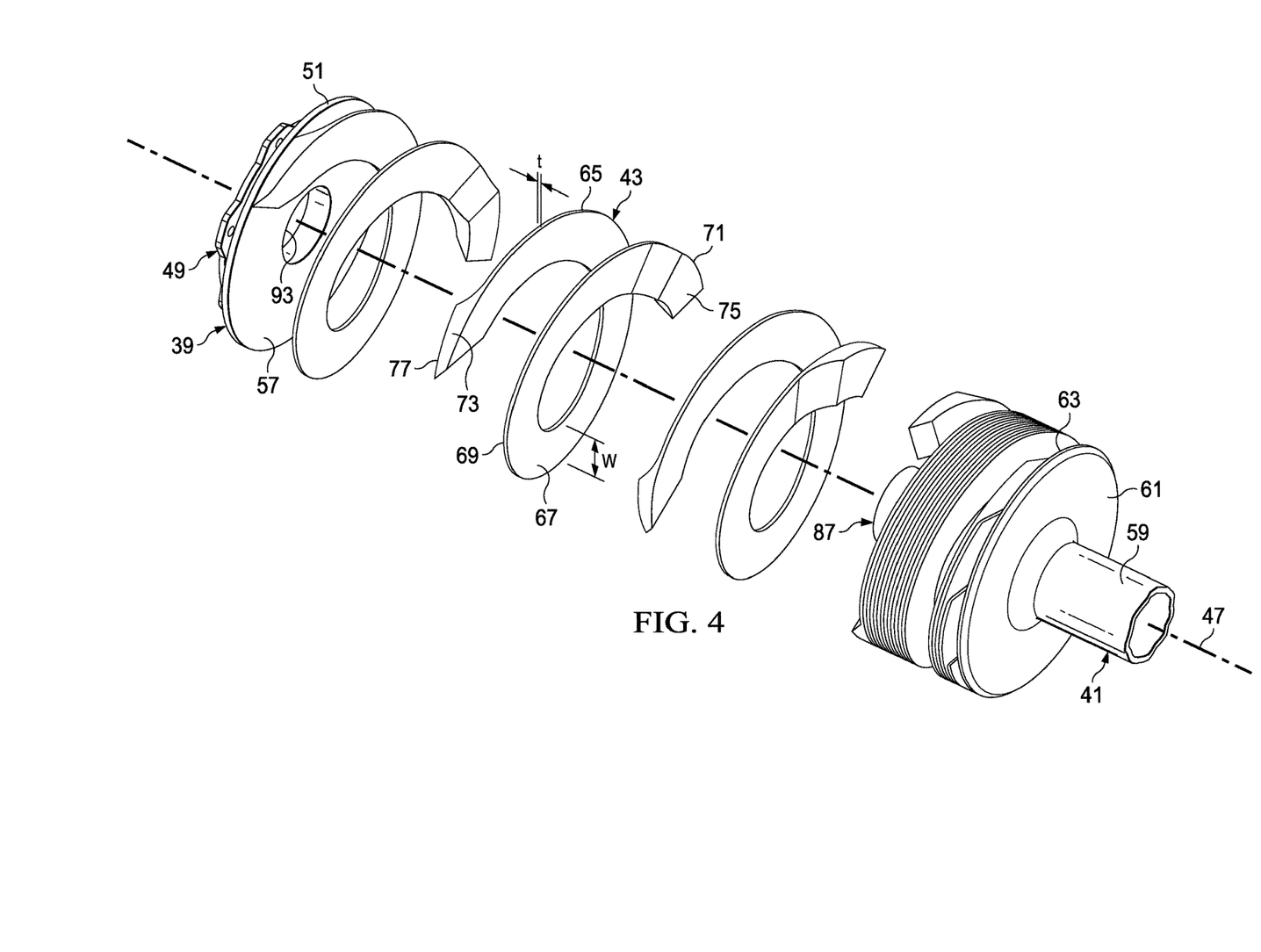
FIG. 4 is a partially exploded oblique view of a portion of the drive coupling of FIG. 3.
Figure 5:
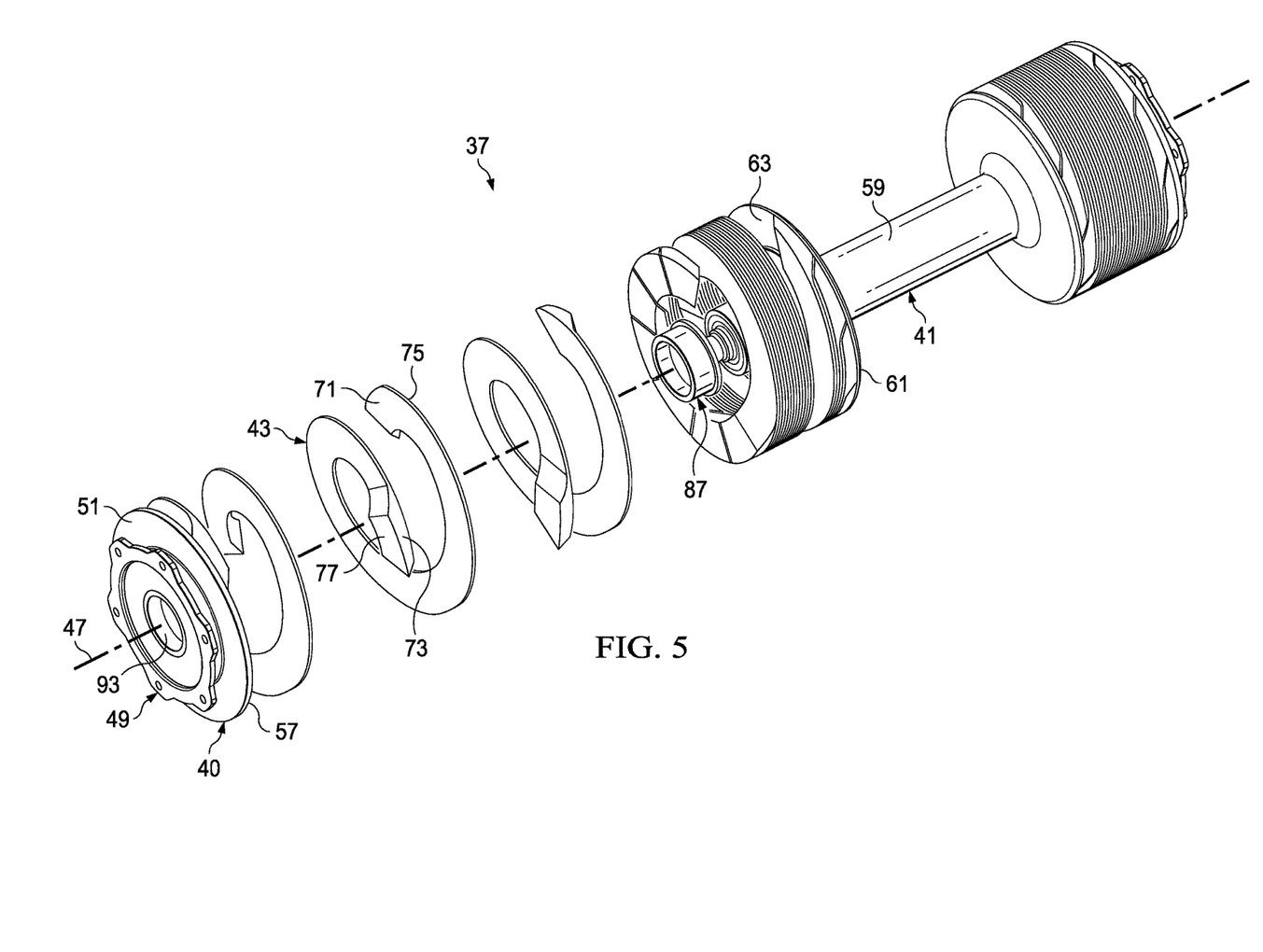
FIG. 5 is a partially exploded oblique view of the drive coupling of FIG. 3.

In order to provide for misalignment and relative motion of the components coupled by coupling 37, helical elements 43 in each stack 45 are attached to the corresponding stack attachment surfaces 57, 63, and deformation of elements 43 during rotation of coupling 37 allows end adapters 39, 40 to rotate on axes misaligned from axis 47. In the embodiment shown, each stack 45 comprises ten helical elements 43, though the number of elements 43 in a specific application will be based on the configuration of elements 43 and the amount of torque required to be carried by each element 43. Each helical element 43 comprises a thin, flexible helical band 65 shown as having a generally rectangular cross-section with a width of w and a thickness of t, as shown in FIG. 4, though other cross-section shapes can be used. The specific values of w and t will be selected based on the expected torque values and number of elements 43 used. Band 65 has an inner surface 67 and an outer surface 69, and band 65 terminates at each end in an attachment pad 71, 73. In the embodiment shown, each pad 71, 73 is a thick section with a flat pad-attachment surface 75, 77 that is preferably perpendicular to axis 47. Application of force to pads 71, 73 of an element 43 will cause relative movement of pads 71, 73 through deformation of that element 43.

Coupling 37 is assembled by fitting together helical elements 43 into a coaxial stack 45 with pads 71 adjacent each other in a radial array and pads 73 adjacent each other in a radial array. Pads 71 of a stack 45 are coupled to surface 57 of outer stack flange 51 of end adapter 39, 40 and pads 73 of the same stack are coupled to surface 63 of stack flange 61 on one end of drive shaft 41. Pads 71, 73 may be coupled to stack flanges 51, 61 by any appropriate methods, including fastening, welding, or adhering. For example, in one embodiment, components of coupling 37 are formed from one or more types of a polymer material, such as fiber-reinforced thermoplastics, and pads 71, 73 are welded to stack flanges 51, 61 through any appropriate means, such as ultrasonic or radio-frequency welding. In the embodiment shown, bands 65 of helical elements 43 within a stack 45 are spaced from each other by a gap of distance d, which is most easily seen in FIG. 7, and this space allows for relative motion of bands 65 during operation.

Figure 10:
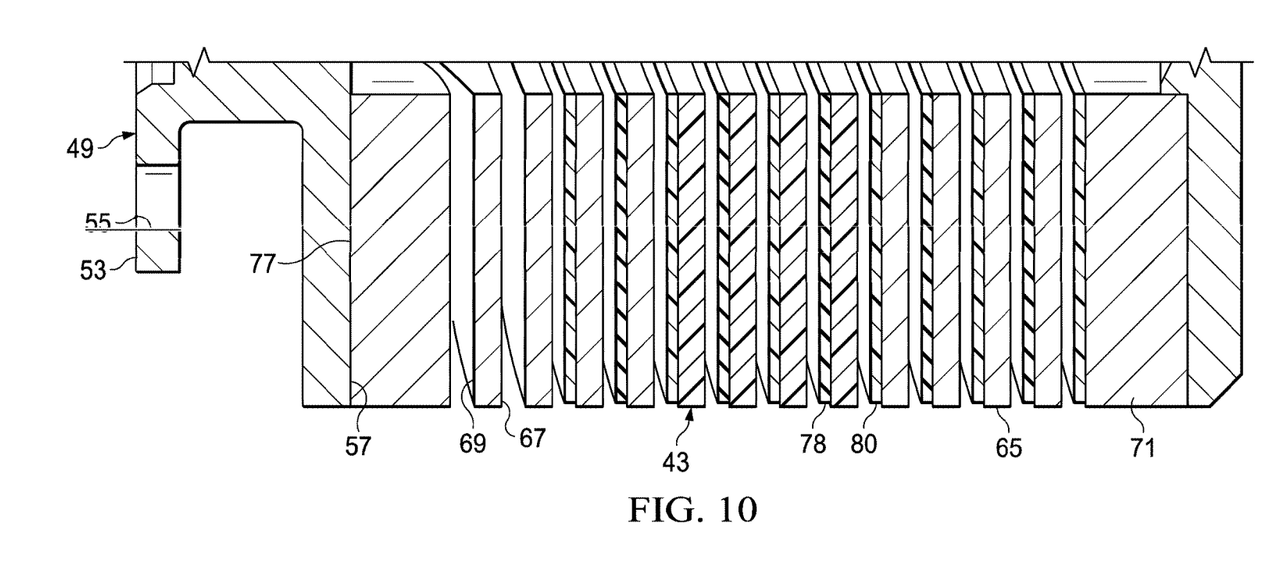
FIG. 10 is a partial cross-section side view of an alternative embodiment of a helical drive coupling according to this disclosure.

As shown in FIG. 10, elastomeric material 78 may be inserted between inner surface 67 and outer surface 69 of adjacent elements 43 or adhered to one or both of surfaces 67, 69, and elastomeric material 78 may or may not completely fill the gap between bands 65. In another alternative embodiment, each stack 45 is coated in elastomeric material 78, such as by dipping or spraying. The addition of elastomeric material 78 can allow some relative movement of bands 65 while limiting or preventing wear and/or damage of bands 65 due to contact with adjacent bands 65 during operation. In addition, elastomeric material 78 may add to the stability of the stack 45 during operation. In the embodiment shown in FIG. 10, some of bands 65 are formed from a fiber-reinforced composite material.

It should be noted that helical elements 43 of both stacks 45 of coupling 37 are identical, though differing elements 43 can be used in stacks 45 if at least being configured with the helix twisting in the same direction. This allows torque to preferably be transferred by, for example, "winding" elements 43 tighter (i.e., tending to reduce the radius of the helix about axis 47) on both ends of coupling 37 when under load. Couplings 37 according to this disclosure may alternatively have helical elements 43 that are configured in a direction that tries to "unwind" elements 43 (i.e., tending to increase the radius of the helix about axis 47) of both stacks 45 when under load.

In some applications, the redundant nature of the design of coupling 37 allows for continued use of coupling 37 after one or more helical elements 43 have become damaged or broken. A broken element 43 will likely provide for easy detection of the failure due to a 1/rev oscillation at the rotation frequency, but it may be desirable to also install between bands 65 a fault-indicating material 80 (shown in FIG. 10) that will display visible indicia in the failure location to aid detection of a failure. For example, the fault-indicating material can be formed with a high-visibility color, and/or the material can be configured to change color, melt, create dust, or create any other visible change as a visual indication of a failure. Coupling 37 can also include fault-indicating material 80 that makes an audible sound, noise, or tone to alert a crewmember that coupling 37 is operating with one or more failed elements 43 and will soon need maintenance.

Figure 6:
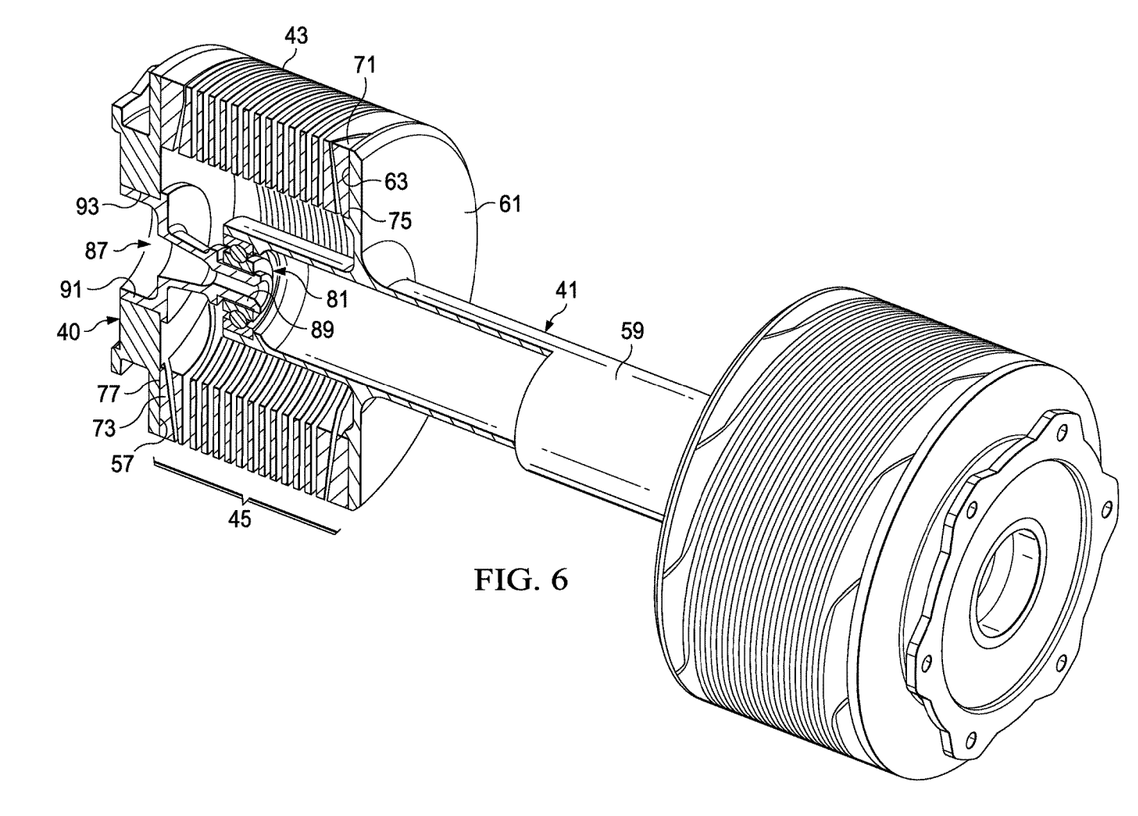
FIG. 6 is a partial-cutaway oblique view of the drive coupling of FIG. 3.
Figure 7:
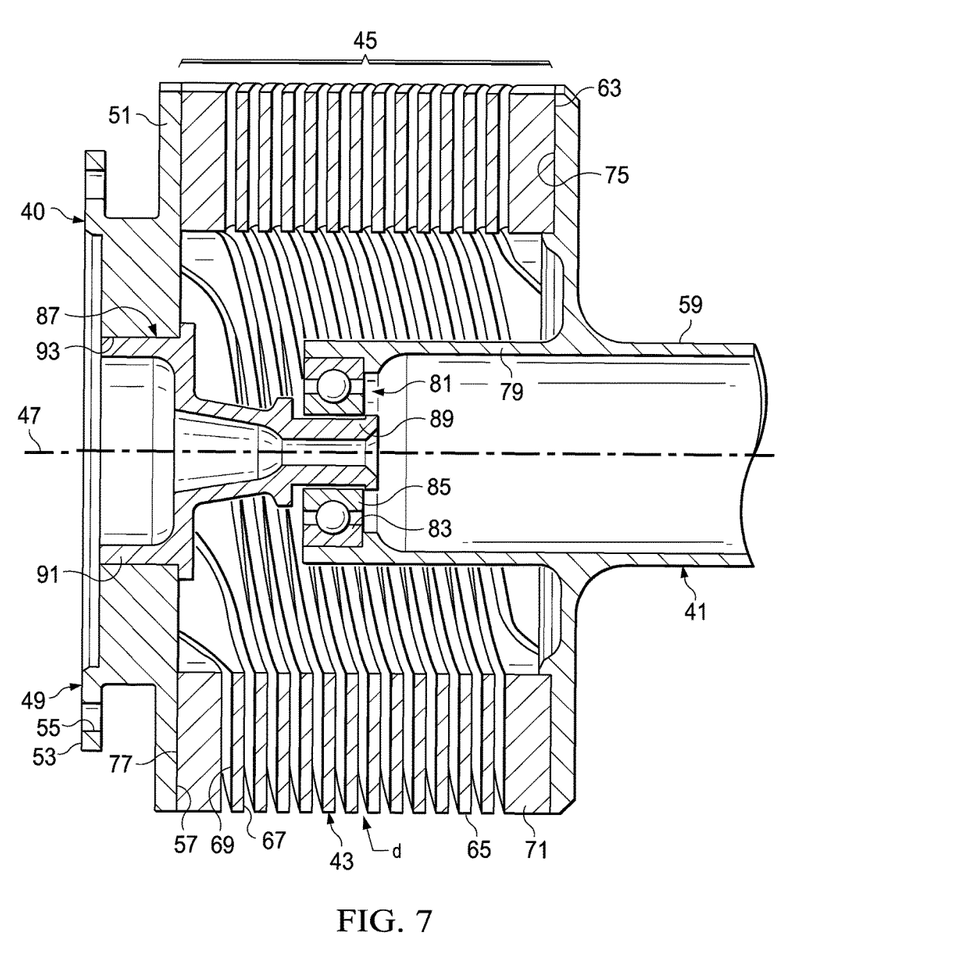
FIG. 7 is a cross-section side view of a portion of the drive coupling of FIG. 3.

Referring specifically to FIGS. 6 and 7, coupling 37 is shown with an optional anti-flail bearing assembly that can allow for continued use of coupling 37 even with one or more failed elements 43. An extended portion 79 of drive shaft 41 protrudes outward along axis 47 and extends within helical elements 43 of stack 45. A bushing or bearing, such as ball bearing 81, is installed as coaxial with axis 47 and in the outer end of extended portion 79, bearing 81 comprising outer race 83 and inner race 85. Outer race 83 is affixed within portion 79, and inner race 85 is rotatable about axis 47 relative to drive shaft 41. An anti-flail spindle 87 has a shaft 89 protruding inward from a centering cup 91, which is sized for insertion into bore 93 in end adapter 39, 40. Cup 91 is rigidly affixed within bore 93, whereas shaft 89 has a smaller outer diameter than the inner diameter of inner race 85, allowing shaft 89 to move radially a limited distance before contacting inner race 85. This anti-flail assembly accommodates misalignment between end adapter 39, 40 and drive shaft 41 while providing for failsafe operation in the event that one or more elements 43 are broken. If enough elements 43 fail so that excessive relative motion occurs between at least one of end adapters 39, 40 and drive shaft 41, shaft 89 of spindle 87 can orbit within inner race 85 and maintain a maximum allowable amount of motion during a limited time of continued operation. A preferred goal of the embodiment shown is to allow for 4 or more hours of continued operation after a failure of one or more elements 43.

Figure 8:
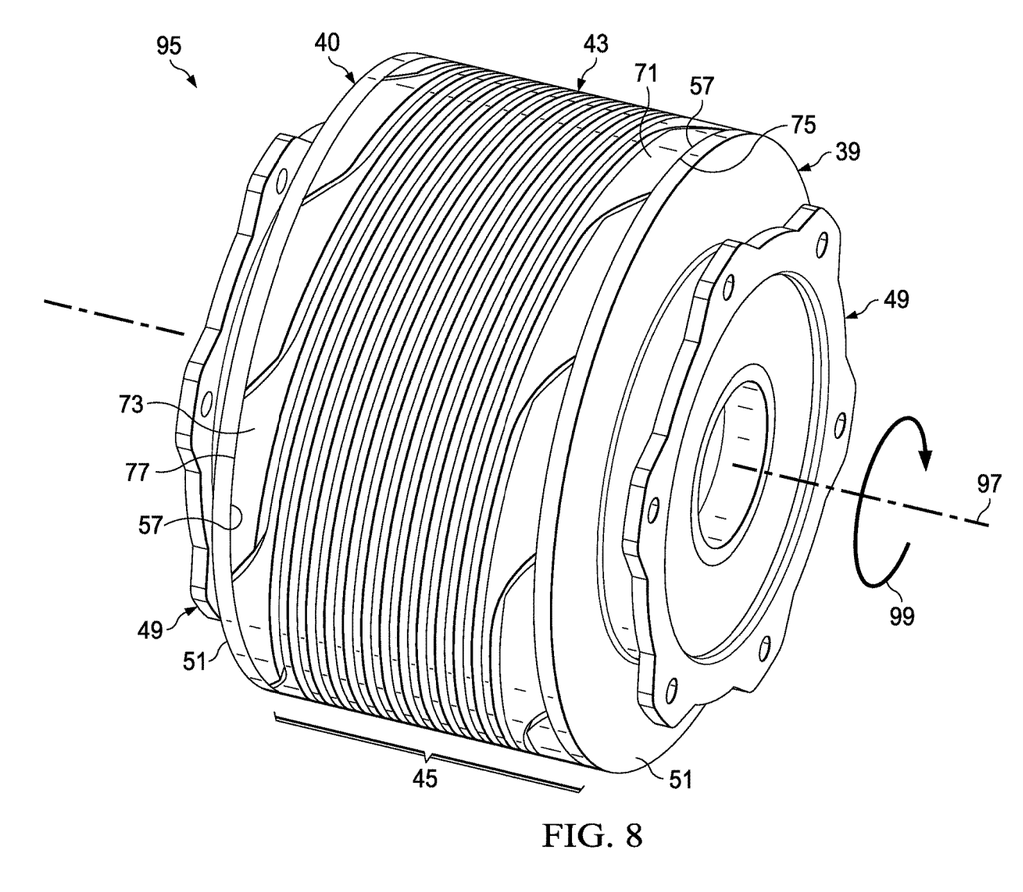
FIG. 8 is an oblique view of an alternative embodiment of a helical drive coupling according to this disclosure.

FIG. 8 illustrates another embodiment of a drive coupling according to this disclosure. Coupling 95 is constructed from similar or identical components as those used in coupling 37, described above, and the foregoing descriptions apply to like-numbered components. Coupling 95 is configured to rotate during operation about a nominal axis 97 and transfer torque from end adapter 39 to end adapter 40 in the direction shown by arrow 99, the direction being reversed if torque is input to end adapter 40. Coupling 95 has only one stack 45 of elements 43 and lacks drive shaft 41, second stack 45 of elements 43, and the optional anti-flail bearing assembly. Coupling 95 allows for cocking and chucking of end adapters 39, 40 during operation in the same manner as stacks 45 described above for coupling 37, and elastomeric material may be used with coupling 95 as described above for coupling 37.

Figure 9:
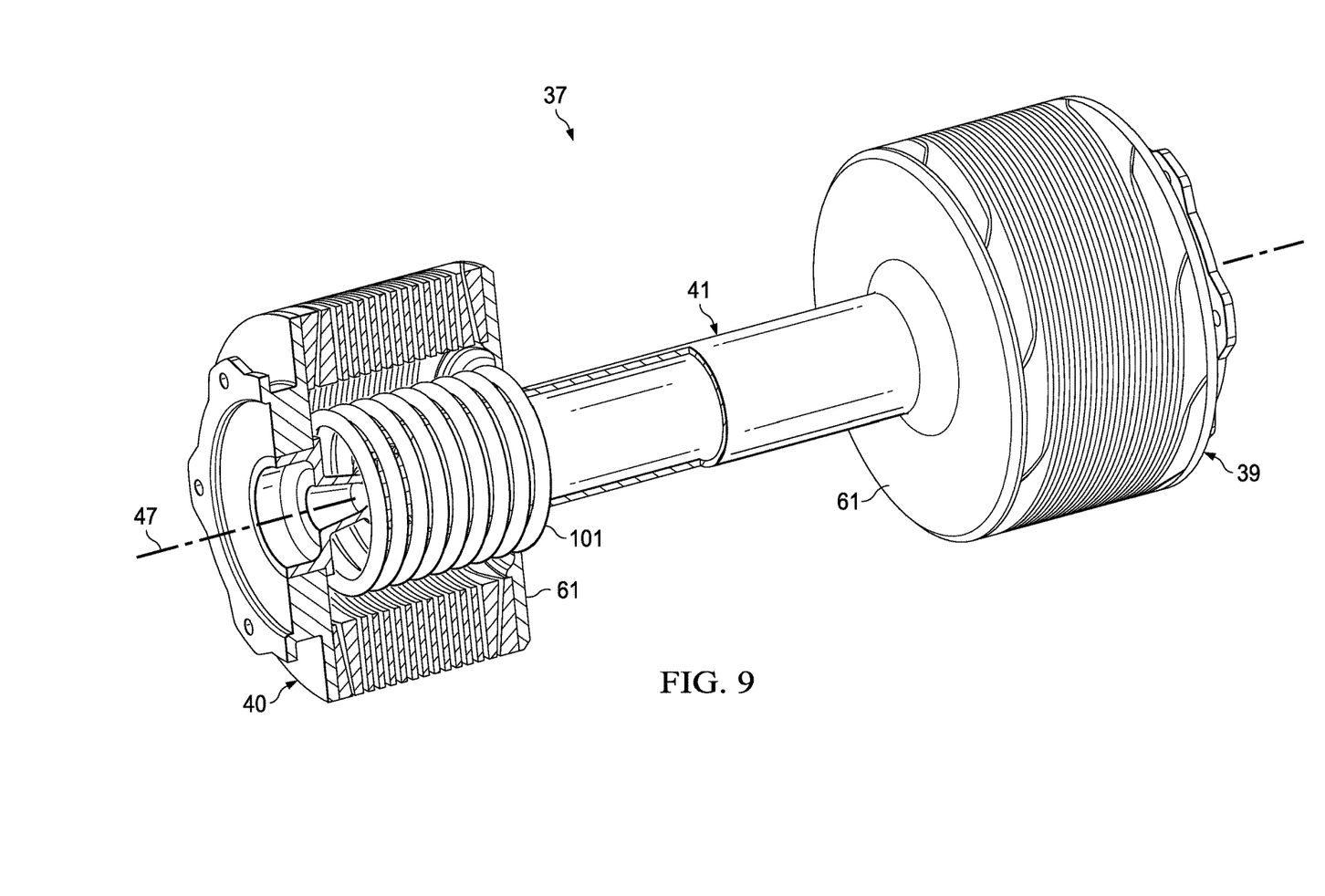
FIG. 9 is a partial-cutaway oblique view of an alternative embodiment of a helical drive coupling according to this disclosure.

FIG. 9 illustrates an additional component that can be used with embodiments of couplings according to this disclosure. Coupling 37 is shown with at least one optional axial biasing device, such as coil spring 101, installed for use in controlling chucking frequencies in coupling 37. Spring 101 is preferably coaxial to axis 47 and provides an axial biasing force between one of inner stack flanges 61 of drive shaft 41 and the associated end adapter 39, 40. Use of a biasing device with selected characteristics provides for biasing end adapters 39, 40 relative to each other for tuning of harmonics that can arise during operation of coupling 37. Likewise, an optional axial biasing device, such as a coil spring, can be used in coupling 95 to provide a biasing force between end adapters 39, 40 to allow for tuning of chucking frequencies.

At least one embodiment is disclosed and variations, combinations, and/or modifications of the embodiment(s) and/or features of the embodiment(s) made by a person having ordinary skill in the art are within the scope of the disclosure, Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A drive coupling, comprising:
   first and second coaxial end adapters;
   a first set of at least two coaxial helical elements, a first end of each element being attached to the first end adapter, a second end of each element being coupled to the second end adapter;
   elastomeric material located between at least some of the helical elements; and
   at least one biasing device for biasing the end adapters relative to each other;
   wherein torque applied to one of the end adapters is transferred through the first set of helical elements to the other end adapter, the helical elements allowing for misalignment of the end adapters during operation.

2. The drive coupling of claim 1, wherein the helical elements are formed from metal or fiber-reinforced composite.

3. The drive coupling of claim 1, further comprising:
   fault-indicating material associated with the helical elements, the fault-indicating material producing visible indicia after the coupling is operated with one or more failed helical elements.

4. The drive coupling of claim 1, further comprising:
   fault-indicating material associated with the helical elements, the fault-indicating material producing an audible sound during operation of the coupling with one or more failed helical elements.

5. The drive coupling of claim 1, further comprising:
   a drive shaft;
   a second set of at least two helical elements, a first end of each element being attached to the second end adapter, a second end of each element of the second set being attached to a first end of the drive shaft;
   wherein the second end of each element of the first set is attached to a second end of the drive shaft, thereby coupling the elements of the first set to the second end adapter.

6. The drive coupling of claim 5, further comprising:
   a spindle extending from at least one end adapter and configured to engage the drive shaft for limiting misalignment of the associated end adapter relative to the drive shaft.

7. The drive coupling of claim 5, further comprising:
   a bearing mounted in one end of the drive shaft;
   a spindle extending from one of the end adapters and configured to engage the bearing of the drive shaft for limiting misalignment of the associated end adapter relative to the drive shaft.

8. The drive coupling of claim 1, wherein the helical elements are intermeshed.

9. A drive coupling, comprising:
a drive shaft having first and second ends;
first and second coaxial end adapters;
a first set of at least two coaxial helical elements, a first end of each element of the first set being attached to the first end adapter, a second end of each element of the first set being attached to the first end of the drive shaft;
a second set of at least two coaxial helical elements, a first end of each element of the second set being attached to the second end adapter, a second end of each element of the second set being attached to the second end of the drive shaft;
elastomeric material located between at least some of the helical elements; and
at least one biasing device for biasing one of the end adapters relative to the associated end of the drive shaft;
wherein torque applied to one of the end adapters is transferred through the associated set of elements, through the drive shaft, and then through the other set of helical elements to the other end adapter, the helical elements allowing for misalignment of the end adapters relative to each other and to the drive shaft during operation.

10. The drive coupling of claim 9, wherein the helical elements are formed from metal or fiber-reinforced composite.

11. The drive coupling of claim 9, further comprising:
fault-indicating material associated with the helical elements, the fault-indicating material producing visible indicia after the coupling is operated with one or more failed helical elements.

12. The drive coupling of claim 9, further comprising:
fault-indicating material associated with the helical elements, the fault-indicating material producing an audible sound during operation of the coupling with one or more failed helical elements.

13. The drive coupling of claim 9, further comprising:
a spindle extending from at least one end adapter and configured to engage the drive shaft for limiting misalignment of the associated end adapter relative to the drive shaft.

14. The drive coupling of claim 9, further comprising:
a bearing mounted in one end of the drive shaft;
a spindle extending from one of the end adapters and configured to engage the bearing of the drive shaft for limiting misalignment of the associated end adapter relative to the drive shaft.

15. The drive coupling of claim 9, wherein the helical elements are intermeshed.

16. A drive coupling, comprising:
a drive shaft having first and second ends;
first and second coaxial end adapters;
a first set of at least two coaxial helical elements, a first end of each element of the first set being attached to the first end adapter, a second end of each element of the first set being attached to the first end of the drive shaft;
a second set of at least two coaxial helical elements, a first end of each element of the second set being attached to the second end adapter, a second end of each element of the second set being attached to the second end of the drive shaft;
elastomeric material located between at least some of the helical elements;
a bearing mounted in one end of the drive shaft; and
a spindle extending from one of the end adapters and configured to engage the bearing of the drive shaft for limiting misalignment of the associated end adapter relative to the drive shaft;
wherein torque applied to one of the end adapters is transferred through the associated set of elements, through the drive shaft, and then through the other set of helical elements to the other end adapter, the helical elements allowing for misalignment of the end adapters relative to each other and to the drive shaft during operation.

17. The drive coupling of claim 16, further comprising:
at least one biasing device for biasing one of the end adapters relative to the associated end of the drive shaft.

* * * * *